United States Patent [19]
Campbell

[11] Patent Number: 5,524,186
[45] Date of Patent: Jun. 4, 1996

[54] METHOD AND APPARATUS FOR PREVENTING PRINT OVERRUNS BY PRE-RASTERIZING AND STORING COMPLEX PAGE STRIPS IN SUPPLEMENTAL PRINTER MEMORY

[75] Inventor: Russell Campbell, Boise, Id.

[73] Assignee: Hewlett-Packard Company, Palo Alto, Calif.

[21] Appl. No.: 250,893

[22] Filed: May 31, 1994

[51] Int. Cl.$^6$ .................................................. G06K 15/00
[52] U.S. Cl. ............................................ 395/115; 395/113
[58] Field of Search .................................. 395/115, 114, 395/101, 113, 116, 117, 112; 358/448

[56] References Cited

U.S. PATENT DOCUMENTS

| | | | |
|---|---|---|---|
| 4,581,710 | 4/1986 | Hasselmeier | 364/523 |
| 5,109,478 | 4/1992 | Jung | 395/112 |
| 5,122,884 | 6/1992 | Gilbert et al. | 358/298 |
| 5,129,049 | 7/1992 | Cuzzo et al. | 395/113 |
| 5,357,614 | 10/1994 | Pattisam et al. | 395/250 |
| 5,444,827 | 8/1995 | Briggs et al. | 395/115 |

Primary Examiner—Raymond J. Bayerl
Assistant Examiner—Steven P. Sax

[57] ABSTRACT

A printer includes a procedure for assigning received print commands, in a page intermediate form, to page strips to be printed. The page strips are subsequently rasterized. The printer implements a method for predetermining whether the received print commands exceed an adaptively determined complexity threshold and, if so, the received print commands are rasterized immediately and stored in supplemental memory. The method includes the steps of: determining for each object to be printed on a page, in which page strip or page strips the object resides; for a portion of the object residing in a first page strip, finding a print complexity factor for the portion of the object; summing the found print complexity factor to previously found print complexity factors to determine an intermediate strip complexity factor for the page strip; providing an immediate rasterization threshold value which is varied in accordance with the amount of available supplemental memory; comparing the intermediate strip complexity factor to the immediate rasterization threshold and if it exceeds the threshold, rasterizing all objects in the first strip and storing the rastered data in the supplemental memory. The method further provides for adjustment of an amount of memory assigned to supplemental memory so as to enable more immediate rasterization when memory is plentiful.

10 Claims, 3 Drawing Sheets

METHOD AND APPARATUS FOR PREVENTING PRINT OVERRUNS BY PRE-RASTERIZING AND STORING COMPLEX PAGE STRIPS IN SUPPLEMENTAL PRINTER MEMORY

FIELD OF THE INVENTION

This invention relates to printers and, more particularly, to a method and apparatus for assuring that a constant speed print mechanism has rasterized data awaiting printing.

BACKGROUND OF THE INVENTION

Many prior art page printers capture an entire page image before any images are placed on paper. In printers which employ laser engines as the "print mechanism", data must be provided at a speed that is fast enough to keep up with the print action. In such printers, formatting of a page is either performed on the host computer, with large volumes of rasterized image data transmitted to the printer at high speed, or on a formatter within the printer itself. Since a laser print engine operates at a constant speed, if rasterized image data is not available when a previous segment of image data has been printed, a "print overrun" occurs and the page is not printable.

A number of methods have been used to avoid print overruns. First, a full raster bit map of an entire page is stored in the printer so that the print mechanism always has rasterized data awaiting printing. This solution requires large amounts of random access memory for each page. A second method constructs a display list and builds a page image in two steps. During formatting, a page description received from a host is converted into a series of simple commands, called display commands that describe what must be printed. The display commands are parsed and the objects to be displayed are then rendered into a raster bit map of the image. This procedure often enables lesser amounts of random access memory to be used for the print image.

The prior art has further improved on the second method by sorting display commands according to their vertical positions on a page, with the page then being divided into sections called page strips, which page strips are individually rasterized and passed to the print engine for printing. When such a printer receives image commands, the commands are processed to derive raster graphics data. At such time, sub-images are created. Next, the sub-images are linked into an intermediate page representation ("page intermediate"). Page intermediate is a means of representing an entire page of information in a format that is easily convertible to video, while consuming as little memory as possible. Page intermediate processing essentially assigns each page strip a prescribed number of "instruction buckets". Each strip is allocated a height (e.g., 128 dots) and contains a pointer to a chain of buckets of predetermined size, each "bucket" containing instructions which define how raster video should be created for the strip. Sub-images (and other intermediate objects) that span more than one strip have an instruction for each page strip in which they are resident.

After page intermediate data has been assigned to the respective page strips, the page strips are individually rasterized and passed to the print engine for printing. When page intermediate data is rasterized at a fast enough pace, the same memory used to store a first page strip can be reused for a subsequent page strip further down the page. However, under certain circumstances, certain complex page strips will require longer than normal time for rasterization. If the rasterization time is too long, a succeeding strip cannot be delivered on time and a print overrun may occur.

In U.S. Pat. No. 5,129,049 to Cuzzo et al., a page printer is described which addresses the problem created by complex page strips. Cuzzo et al. allocate a page strip rasterization time to each page strip, calculated by dividing the printer's page print time by the number of page strips. A rasterization execution time (RET) for page intermediate data assigned to a page strip is then calculated, based upon the complexity of the page intermediate data assigned to the page strip. If RET for the page intermediate data assigned to a page strip exceeds the allocated page strip rasterization time (indicating a complex page strip), the page intermediate data for the complex page strip is rasterized immediately. Otherwise, the page intermediate data for the page strip is inserted into a queue and is rasterized as the page strip is reached. When a complex page strip is reached for processing and printing, its pre-rasterized version is immediately accessed and sent to the print mechanism, thereby preventing a print overrun.

In copending U.S. patent application Ser. No. 07/940,111 to Campbell et al. (assigned to the same Assignee as this application), a further procedure for employing page intermediate representations is described wherein procedures are employed to avoid "low memory" or "memory-out" conditions. One of those procedures involves the pre-rasterization of a page strip whose assigned page intermediate data exceeds a fixed threshold. The page intermediate data for such page strip is immediately converted to video raster and is then compressed using a lossless compression technique. The compressed data is then stored for later use when the page strip is sent to the print engine. However, before transfer, the compressed raster data must be decompressed. The compression and decompression actions are time consuming and are impediments to the achievement of higher print speeds.

In implementing the procedure of Campbell et al., a "thrashing" condition may occur. Thrashing occurs when available random access memory for rasterized strip image data is indicated as "low". At such time, the page intermediate commands for a page strip are rasterized and the rasterized data is compressed. The memory occupied by the page intermediate data for the rasterized page strip is deallocated and the compressed raster strip data is segmented into pieces and put into whatever available memory was freed up by the removal of the page intermediate commands. Simultaneously, the printer reads out raster data from another raster strip buffer. After all of this has been accomplished, a low memory situation can still occur, requiring decompression of the dissected page strip and a repeat of the process using another compression procedure. All of these actions are time consuming and can slow down a printer's operation significantly. While the addition of further buffer memory will alleviate the problem, the buffer memory must be intelligently used or printer performance and cost can be adversely affected.

Accordingly, it is an object of this invention to provide an improved method and apparatus for reducing the possibility of print overruns in a constant speed print mechanism.

It is another object of this invention to provide an improved method and apparatus for the handling of print data which avoids the need for compression and decompression of the data, It is yet another object of this invention to provide an improved constant speed printer wherein the use of page intermediate processing is adaptively adjusted in accordance with an amount of random access memory that is available for rasterized print data,

SUMMARY OF THE INVENTION

A printer includes a procedure for assigning received print commands, in a page intermediate form, to page strips to be printed. The page strips are subsequently rasterized. The printer implements a method for predetermining whether the received print commands exceed an adaptively determined complexity threshold and, if so, the received print commands are rasterized immediately and stored in supplemental memory. The method includes the steps of: determining for each object to be printed on a page, in which page strip or page strips the object resides; for a portion of the object residing in a first page strip, finding a print complexity factor for the portion of the object; summing the found print complexity factor to previously found print complexity factors to determine an intermediate strip complexity factor for the page strip; providing an immediate rasterization threshold value which is varied in accordance with the amount of available supplemental memory; comparing the intermediate strip complexity factor to the immediate rasterization threshold and if it exceeds the threshold, rasterizing all objects in the first strip and storing the rastered data in the supplemental memory.

DETAILED DESCRIPTION OF THE INVENTION

Figure 1:
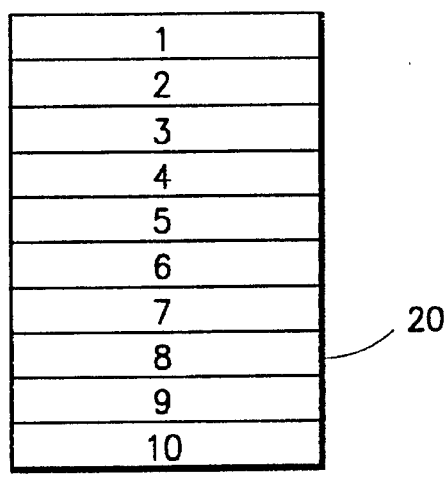
FIG. 1 is an outline of a page and indicates how the page is broken into ten contiguous page strips.

Referring to FIG. 1, a page printer incorporating the invention treats a page 20 as a series of strips. As an example, ten strips are shown, each one covering a horizontal aspect of page 20. Text, graphics, etc., appearing in any one page strip are treated separately during the processing of a page. Assuming that the page printer has the capability of producing eight pages per minute, each page is produced in 7.5 seconds. Since there are ten strips, each strip is arbitrarily allocated a page strip rasterization time (PSRT) of 0.75 seconds. At a gross level, PSRT indicates the available time for processing (i.e., rasterizing) a series of page intermediate display commands assigned to a page strip. If rasterization occurs within a PSRT, the page printer is able to maintain its specified page print rate and a print overrun does not occur. The choice of ten strips is merely exemplary and other page strip allocations are contemplated.

Figure 2:
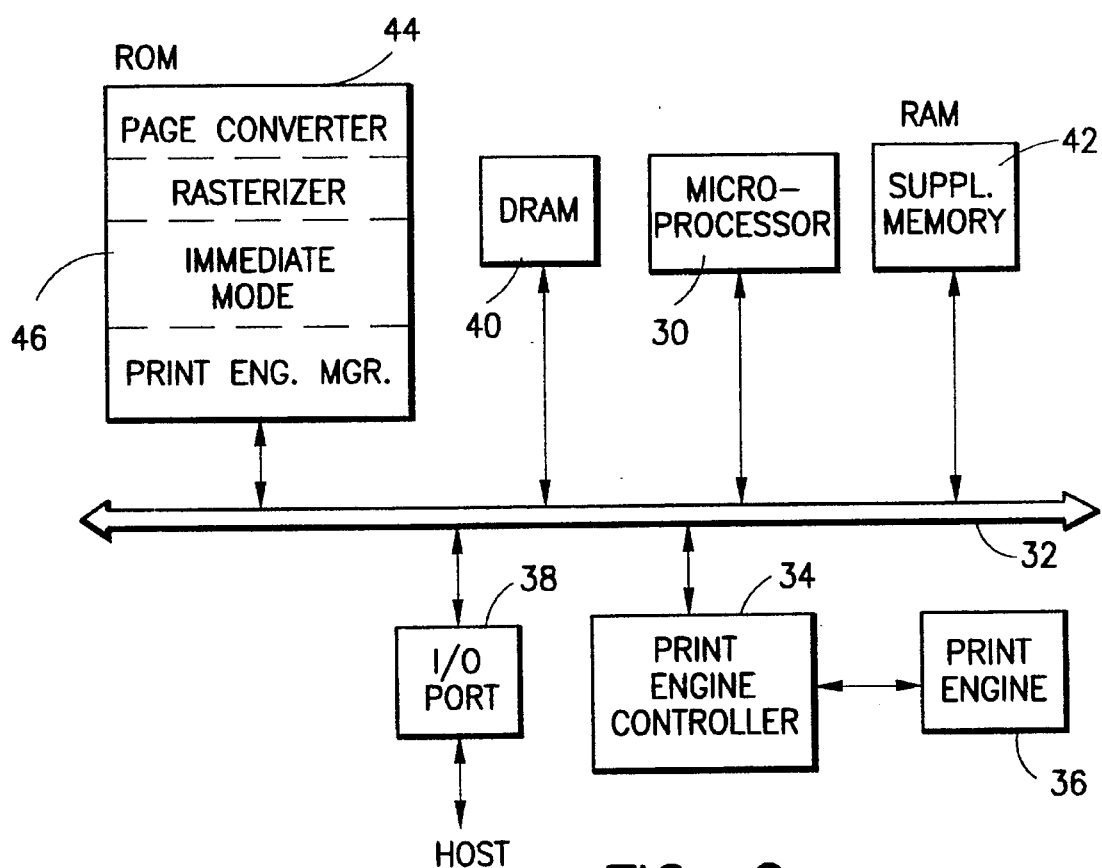
FIG. 2 is a high level block diagram of a printer that embodies the invention.

In FIG. 2, a high level block diagram illustrates a page printer incorporating the invention. The page printer is controlled by a microprocessor 30 which communicates with other elements of the printer via a bus 32. A print engine controller 34 and associated print engine 36 connect to bus 32 and provide the print output capability for the printer. Print engine 36 is preferably a laser printer that employs an electrophotographic imaging system, as is well known in the art.

An I/O port 38 provides communications between the page printer and a host computer and receives page descriptions from the host computer for processing within the page printer. A dynamic random access memory (DRAM) 40 provides random access memory for the page printer. A portion of DRAM 40 includes three, preallocated raster buffers which are employed during page strip processing. A supplemental random access memory (RAM) 42 is connected to bus 32 and provides additional RAM that may be assigned to store rasterized page strip data that exceeds a strip complexity factor. Supplemental memory 42 may either be separate from DRAM 40 or be a part thereof. For the purposes of the this description, it will be considered as a separate memory module.

A read only memory (ROM) 44 holds firmware which controls the operation of the page printer. Among the code procedures stored in ROM 44 are: a page converter, a rasterizer, an immediate-mode procedure, and a print engine manager. The page converter firmware converts a page description received from the host processor to a display command list (i.e. page intermediate) for each page strip. Each display command defines an object to be printed in the page strip. The rasterizer firmware converts each display command to an appropriate bit map which is stored in a page strip buffer. A page print scheduler (not shown) controls the sequencing and transfer of strip buffers from DRAM 40 to print engine controller 34. The print engine manager controls the operation of print engine controller 34 and, in turn, print engine 36.

Immediate-mode procedure 46 enables a determination of whether display commands being assigned to a page strip exceed a strip complexity factor and, if yes, it circumvents further page intermediate processing for the page strip and enables immediate rasterization thereof. The immediate-mode procedure adaptively adjusts the strip complexity factor in accordance with an amount of supplemental memory 42 available for allocation to immediate-mode rasterized page strips. The immediate-mode procedure will be described in detail below.

Operation of page printer of FIG. 2 commences when a page description is received from a host computer via I/O port 38. The page description is placed in DRAM 40 and microprocessor 30 then accesses the page description commands and builds a display command list using the page converter firmware in RAM 48. The display command list is a set of commands that describe what must be printed and comprise the page intermediate format described above. As the display command list is produced, each display command is sorted by its location on the page and is allocated to one or more page strips. Subsequently, the page intermediate commands (i.e., the display list) for each page strip are converted to a rasterized bit map and utilized by print engine 36.

As the page description is being converted to display commands, each display command is examined and its rasterization execution time (RET) is found. When the display commands are then positionally sorted and assigned to the page strips, an RET for a new display command added to a strip is summed with RETs for display commands previously assigned to the strip.

RET is the time needed to render an object from its display command form into a rasterized form. It is known that rasterization time can be found by summing three separate coefficients. The first coefficient is termed "overhead" and is the fixed amount of time microprocessor 30 spends on an object, independent of its size. The second coefficient is "height cost" which is proportional to the object's height, independent of its width. The third coefficient is termed "word cost" and is proportional to the number of words written to the destination bit map strip, independent of the object's height. The relationship between an object's actual RET and the method of predicting RET is dependent upon the rasterization algorithm used and the execution speed of the microprocessor. Thus additional coefficients and descriptive parameters may be deemed useful, dependent upon the specifically used rasterization algorithm and object models.

RET for all objects (e.g., vectors, trapezoids, bit maps) can be determined in advance, each with a different set of coefficients. Once coefficients are determined from various expected objects, they are stored in a table and subsequently accessed when the type and dimensions of an object to be printed become known. Thus, RET for any display command can be readily determined by a table look-up of precalculated coefficients, followed by a calculation of the sum of the coefficients, or modified by the object's size.

An object's "size" is determined by the number of bytes in the display list required to describe the object and is a further independent criteria that is used hereinbelow when determining whether or not to implement the immediate-mode rasterization procedure of the invention.

As can now be seen, during page composition, the page printer computes the total time needed to render the object into a rasterized form (RET) and the size of the object as evidenced by the number of bytes in the display list for the object. Both size and RET are page strip print complexity factors that are utilized to determine whether the immediate-mode procedure should or should not be implemented.

Figure 3:
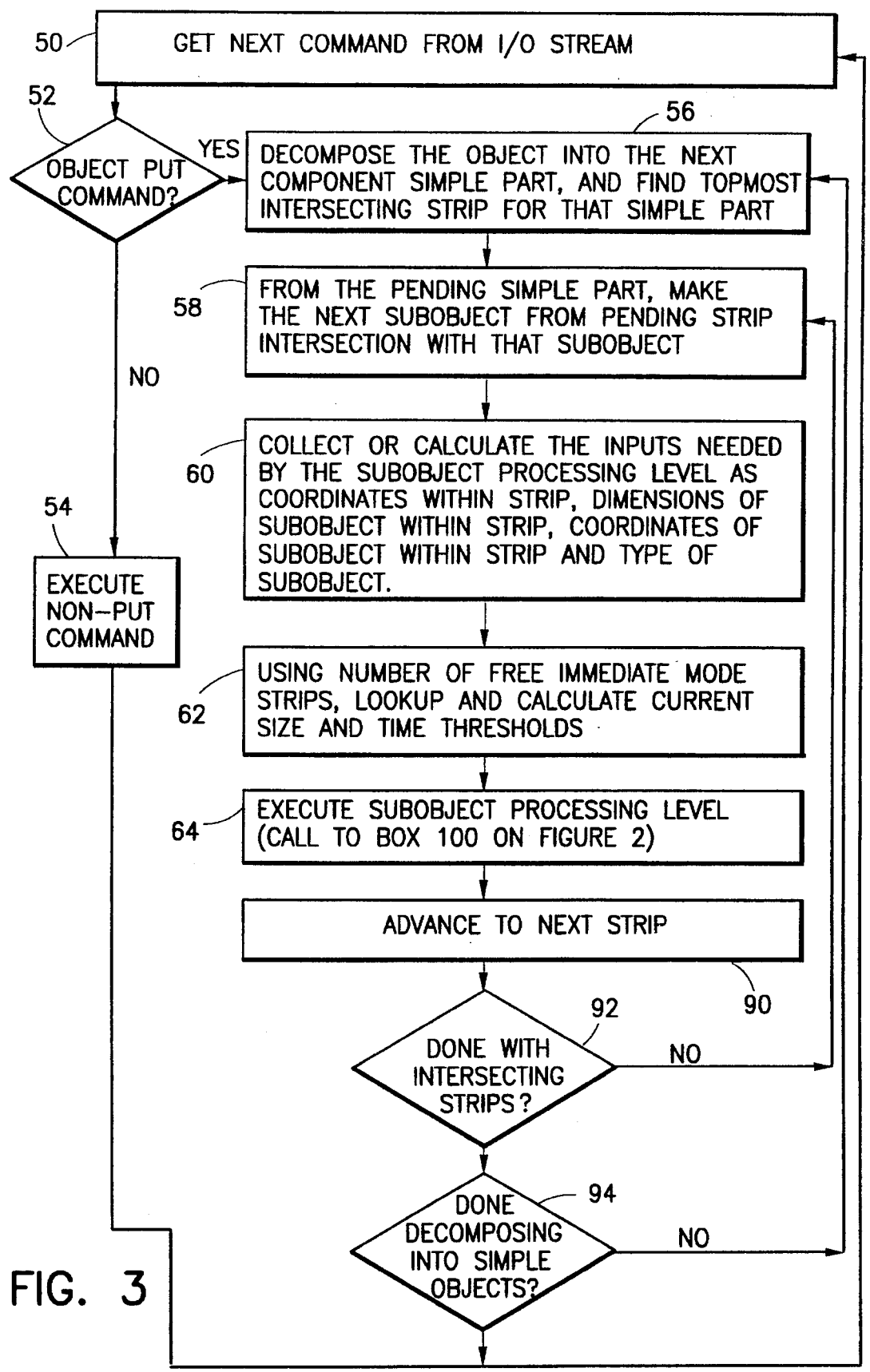
FIGS. 3 and 4 show a high level flow diagram describing the method of the invention.
Figure 4:
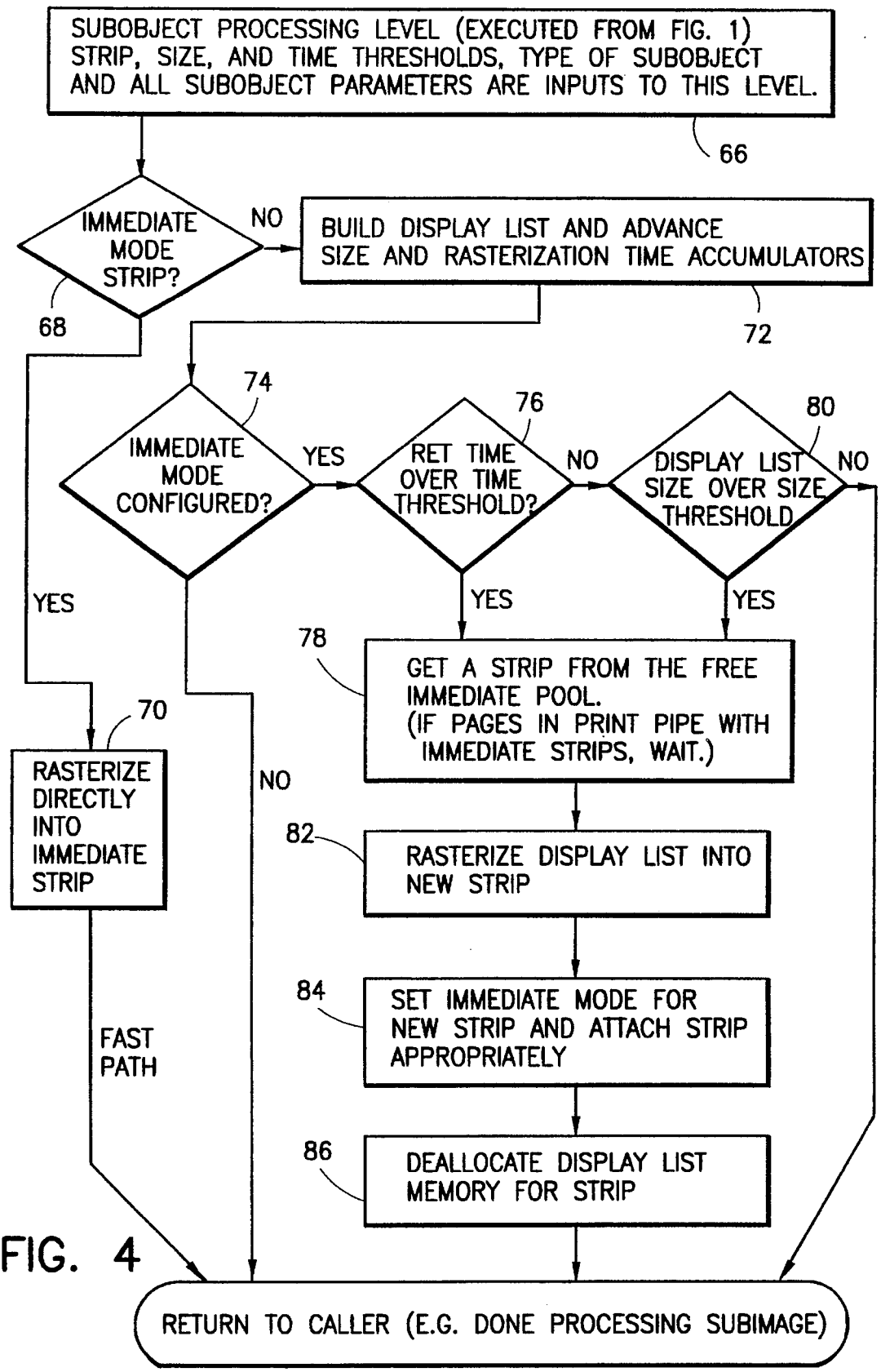

Turning now to FIGS. 3 and 4, the immediate-mode procedure will be described in relation to the illustrated flow diagram. In brief, the immediate-mode procedure enables direct rasterization of selected page strips and the use page-intermediate processing for other strips. For this procedure, supplemental memory 42 is divided into raster strip buffers, which buffers are sequentially allocated to the immediate-mode procedure. As a rasterized image is printed by print engine 38, the RAM occupied by the printed image is released and returned to supplemental memory 42.

As shown in box 50, the first step of the procedure is to access a next command from the I/O stream that is received from a host computer. The command is then examined to determine if it is an "object put". An object put command requires that a mark be placed upon the printed page by print engine 36. Other commands received by a printer that are not object put commands, are executed, as shown in box 54, in the standard manner. If an object put command is received (decision box 52), it is passed to box 56 where it is converted to page intermediate form; the object described by the command is decomposed into a "next component simple part"; and the topmost intersecting strip for that simple part is determined.

More specifically, the object is dissected into its component parts and, for each part, its location with respect to an intersecting page strip is found. One example of an object that needs to be broken into more simple objects is a polygon. A polygon can be decomposed into a series of trapezoids which can be handled by the rasterization function. This type of breakdown is known in the art and needs no further description.

Next, as shown in box 58, the part of the simple object that intersects a current page strip being processed is logically identified by its intersections with the page strip's boundaries. The portion of a simple object that resides within the strip is termed a "sub-object". For example, if the top triangular part of the letter A is the only portion that falls within the current page strip, then that triangle would be the topmost sub-object.

Next, inputs needed by the sub-object processing level shown in FIG. 4 are determined. Those inputs are the coordinates of the current page strip, dimensions of the sub-object within the current page strip, coordinates of the sub-object within the strip and the type of sub-object. The type of sub-object can affect the time to rasterize the object. For instance, if the object is one which includes background patterning, or one which includes various slanted edges that are at an acute angle with the rasterization dimension, the rasterization time for the object may be substantially lengthened.

Microprocessor 30 (FIG. 2) maintains track of the number of available immediate-mode strips within supplemental memory 42 that are available to hold rasterized page strips. The procedure of FIG. 3 employs the number of available immediate-mode page strips to calculate two threshold values that are employed to decide whether immediate-mode rasterization of a page strip should or should not be implemented. In this regard, a threshold adjustment table is accessed and, depending upon the number of available immediate-mode page strips from supplemental memory 42, a threshold adjustment factor is accessed to be used in the threshold calculation. Table 1 below illustrates an example of a threshold adjustment table stored in RAM 44.

TABLE 1

| Megabytes of Available Immediate Strips | Threshold Adjustment Factor | Comments |
| --- | --- | --- |
| 0–2 | 3.0 | Higher thresholds, conserves available strips. |
| 2–4 | 2.0 | |
| 4–8 | 0.6 | Use available strips early, as they are abundant. |
| 8 or more | 0.3 | Least threshold to start fast path. |

The leftmost column of Table 1 illustrates the number of megabytes of memory remaining in supplemental memory 42 that are available to store rasterized page strip data at 600 dpi. The central column illustrates a threshold adjustment factor which is output by the table, depending upon the number of megabytes of available supplemental memory. The more memory that is available from supplemental memory 42, the lower the threshold adjustment factor value. The lower the resulting decision threshold, the more page strips will be subject to immediate-mode rasterization, with concomitantly faster processing and reduced print time. However, when available immediate-mode strip memory is scarce, a larger threshold adjustment factor helps conserve the remaining immediate memory strips until they are really needed. The threshold adjustment factor thus "throttles" the usage of strips from supplemental memory 42, but enables improved print speed when possible while avoiding unnecessary memory-outs.

A time threshold value and a size threshold value (prestored) are now accessed and modified in accordance with the threshold adjustment factor illustrated in Table 1. The time threshold value is a value which, if exceeded, indicates that the cumulative RET of sub-objects currently assigned to a particular page strip is excessive in relation to the time required to rasterize an entire page (e.g. it exceeds 60% of PSRT). In such a case, it is known that the page intermediate conversion followed by page strip rasterization is to be avoided and immediate rasterization employed.

The size threshold is directly related to the number of bytes in the page-intermediate display list already constructed for the pending page strip. If the number of bytes exceeds the size threshold (e.g. approximately one half the size of a page strip—or other user-configurable value), then it is probable that too much processing time will be required to render the remainder of the pending page strip into page intermediate form and to subsequently rasterize the image. In such case, the procedure moves directly to immediate-mode rasterization.

The time threshold is the principal threshold and the size threshold is subsidiary thereto, but may indicate a need to proceed to immediate rasterization of the remainder of the page strip, even if the time threshold has not been exceeded.

At this stage, all of the inputs required for sub-object processing are available, and the process places a call for the sub-object processing level (box 64), and transfers all of the found thresholds, strip coordinates, types of sub-objects, etc. to box 66 (FIG. 4). Recall that the pending processing action is upon one sub-object, but that previous sub-objects may already have been processed for the page strip. Thus, the procedure moves to decision box 68 to determine whether the processing of the previous sub-objects has already caused the page strip to be classified as an immediate-mode strip. If yes, the procedure immediately rasterizes the sub-object (box 70) and moves back to obtain the next command from the I/O stream (box 50) FIG. 3.

If it is determined that the pending strip is not already classified as an immediate-mode strip (decision box 68), the procedure adds the page intermediate commands for the sub-object to the strip's display list. At the same time, the size value for the pending strip is incremented in accordance with the number of added page intermediate bytes. The cumulative rasterization time for the pending strip is also incremented by adding the RET for the sub-object, as determined by reference to RET coefficients for the sub-object (box 72). Both of these actions create intermediate strip complexity factors that are measures of rasterization time for the commands already received for the page strip.

Assuming that the immediate-mode is configured as operational (decision box 74), and at least one intermediate strip is available for the current pate, the accumulated size value for the pending strip and its cumulative rasterization time (RET) are now compared to the pre-computed time and size threshold values. In decision box 76, the accumulated RET time for the pending strip is compared to the time threshold and if it exceeds the time threshold, causes the pending strip to proceed down an immediate-mode rasterization path comprising boxes 78, 82, and 86. If the accumulated RET time for the pending strip does not exceed the time threshold, the accumulated display list size is compared to the size threshold (decision box 80). If the display list size exceeds the size threshold, the pending strip is directed along the immediate-mode processing steps as shown by boxes 78, 82 and 86. Otherwise, the pending strip processing returns to FIG. 3, where a next command is accessed from the I/O stream (box 50).

If the pending page strip is directed along the immediate-mode path, a strip of raster buffer memory is accessed from the available immediate memory pool in supplemental memory 42. If a strip of raster buffer memory is not immediately available, the procedure waits until a pending page is printed so that an immediate-mode strip can be freed-up (box 78). When such a strip is available, the display list for the pending page strip is rasterized and stored in the available raster buffer memory strip (box 82). The page strip is then designated as an immediate-mode strip (box 84) and it is placed in a queue of similar immediate-mode strips. Finally, all memory used for the display list for the pending strip is deal-located as it is no longer needed. At this stage, the sub-object processing procedure is complete and returns to box 50.

When all sub-objects for the strip have been processed (in accordance with the procedure shown in FIG. 4), the procedure advances to a next strip (box 90) and before proceeding to recycle to obtain a next command, determinations are made as to whether the now-current strip still intersects the sub-object previously processed. If so, the procedure loops back to box 58 considers the portions of the sub-object within the now-current strip. Finally, if there was a decomposition of the object into sub-objects and more simple objects remain, the procedure loops back to box 56 and continues.

To this point it has been assumed that supplemental memory 42 comprises a relatively fixed size memory pool from which raster strip buffers may be allocated. Immediate mode procedure 46 further has the ability to adaptively adjust the allocation of RAM within the printer for use as supplemental memory 42. For instance, if microprocessor 30 dynamically determines that excess RAM is available and not needed for other demands, the excess RAM can be added to the RAM pool allocated to supplemental memory 42. Such action will delay the increase in the threshold adjustment factor (Table 1) and will enable more page strips to be subjected to immediate mode, thereby assuring more efficient printer operation. Further, the amount of RAM allocated to supplemental memory 42 can also be user-adjusted through an initial printer configuration operation.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A pre-rasterization method for a printer having a pool of available supplemental memory, said printer including means for assigning received print commands to page strips, each page strip having a display list of page intermediate form code which corresponds to received print commands, said method adaptively determining whether said received print commands exceed an immediate rasterization threshold and, if yes, pre-rasterizing said received print commands, said method comprising the steps of:

a. determining for each object to be printed on a page, in which page strip or page strips said object resides;

b. for a portion of said object residing in a first page strip, finding a print complexity factor for said portion of said object;

c. adding said print complexity factor to previously found print complexity factors for objects residing in said first page strip to determine an intermediate strip complexity factor for said first page strip;

d. determining an immediate rasterization threshold that is adaptively related to available supplemental memory in said printer;

e. if said intermediate strip complexity factor exceeds said immediate rasterization threshold, assigning a portion of said available supplemental memory to said first page strip;

f. rasterizing portions of objects already received and residing in said first page strip, and storing said rasterized portions of said objects in the available supplemental memory assigned to said first page strip; and g. rasterizing portions of objects residing in said first page strip that are received thereafter, and storing said rasterized portions of said objects in the available supplemental memory assigned to said first page strip.

2. The method as recited in claim 1, comprising the further steps of:

a1. converting a received print command corresponding to an object portion to a page intermediate form code and placing said page intermediate form code on a display list for said first page strip; and e1. if said intermediate strip complexity factor does not exceed said immediate-mode threshold, subjecting a next received print command to steps a–g.

3. The method as recited in claim 2, wherein step f. rasterizes objects defined by said intermediate form code from said display list, and memory which is occupied by said display list for said first page strip is made available for other use.

4. The method as recited in claim 1, further comprising the step of:

h. placing a display list for a page strip in a queue for later rasterization when all object portions in said page strip have been received and cumulative print complexity factors for intermediate form code corresponding to said all object portions do not exceed said immediate rasterization threshold.

5. The method as recited in claim 1, wherein said immediate-mode threshold is adjusted higher as available supplemental memory decreases and is adjusted lower as available supplemental memory increases.

6. The method as recited in claim 1, wherein said print complexity factor is a measure of time required to rasterize intermediate form code corresponding to an object portion.

7. The method as recited in claim 1, wherein said print complexity factor is a measure of a number of bytes of intermediate form code in a display list for a page strip.

8. The method as recited in claim 1, wherein the rasterizing action of step g. occurs immediately, as object portions are assigned to the first page strip and further threshold comparisons are curtailed for said object portions.

9. The method as recited in claim 1, comprising the further step of:

adjusting an amount of memory allocated to said pool of available supplemental memory in accordance with an amount of memory not being currently used for other dynamically occurring procedures.

10. The method as recited in claim 1, comprising the further step of:

adjusting an amount of memory allocated to said pool of available supplemental memory at configuration time of said printer.

* * * * *